Oct. 6, 1953
B. C. SKINNER
2,654,734
METHOD FOR SUBJECTING DISCRETE UNITS OF SOLID
MATERIALS TO TREATMENT BY GASEOUS MEDIUMS
Filed Jan. 21, 1948
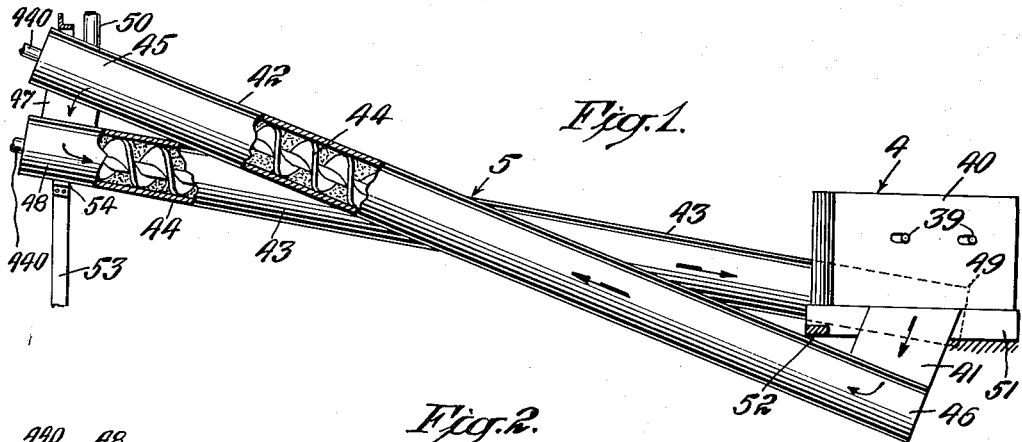
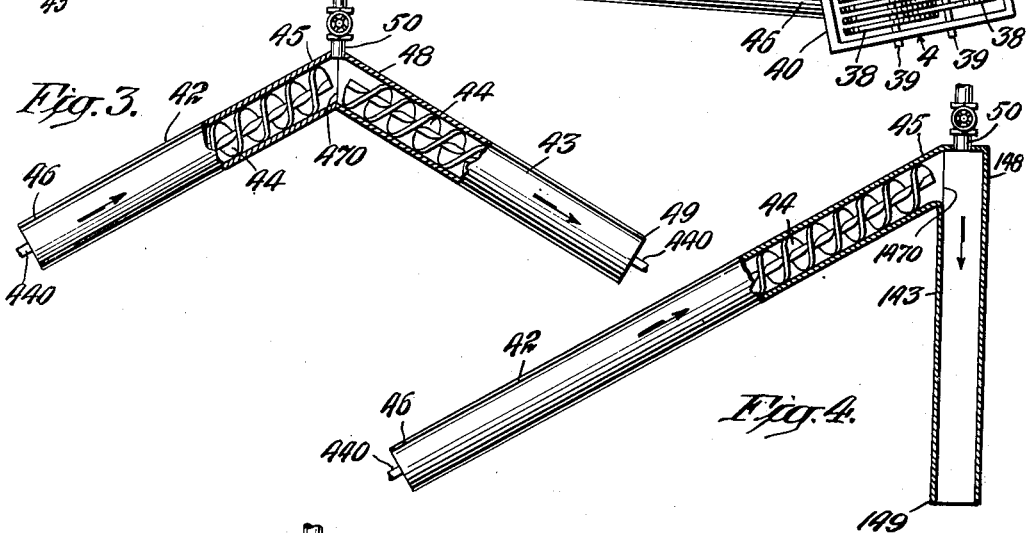
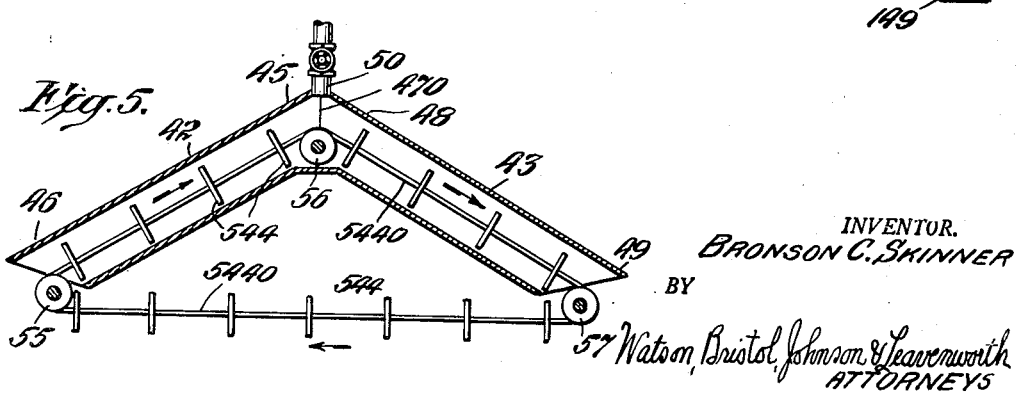
INVENTOR.
BRONSON C. SKINNER
BY
Watson, Bristol, Johnson & Leavenworth
ATTORNEYS Patented Oct. 6, 1953

2,654,734

UNITED STATES PATENT OFFICE 2,654,734

METHOD FOR SUBJECTING DISCRETE UNITS OF SOLID MATERIALS TO TREATMENT BY GASEOUS MEDIUMS

Bronson C. Skinner, Dunedin, Fla., assignor to Clinton Foods Inc., New York, N. Y., a corporation of Delaware Application January 21, 1948, Serial No. 3,516

5 Claims. (Cl. 260—209.5)

The present invention relates to a method of and apparatus for subjecting moving masses of solid materials in the form of discrete units to treatment by lighter-than-air gaseous mediums, such as steam; and the present application is drawn to subject matter disclosed in the Nelson Patent No. 2,455,382, granted December 7, 1948, which was copending with the present application.

A general object of the present invention is to provide such apparatus which is economically constructed and readily operated thoroughly to subject discrete units of solid materials in the form of a continuously flowing or moving stream thereof to certain treatments by lighter-than-air gaseous medium in a manner to be readily adapted to continuous flow procedures and to assure effective action of the gaseous medium on all of the particles in a minimum of time; and the efficient method of so processing the material by operation of the apparatus.

A more specific object of the invention is the provision of such apparatus which provides for countercurrent flow of the material and lighter-than-air gaseous medium and in such manner as to take advantage of the fact that air is heavier than the gaseous medium in assuring in a unique manner efficient action of the gaseous medium on all of the discrete units in the flowing mass of material during substantially the entire movement of the material through the apparatus; thereby being adapted to treatment of various materials, by various gases such as steaming of citrus peel pieces in the production therefrom of certain products, e. g., pectin products, steam blanching of whole fruits or vegetables or pieces thereof, etc.

Another object of the invention is the provision of a preheating treatment of citrus peel pieces during continuous travel thereof by steam which effectively destroys the semi-permeable membranes of the living cells in the peel thereby efficiently permitting diffusion out of the peel into washing liquid of at least certain proportions of sugars and other extraneous or undesirable substances which are in solution in the cell sap resultant elimination thereof, and which weights peel pieces by liquid saturation to permit ready separation therefrom of rag and pulp in the washing liquid by flotation; and a simple and efficient apparatus for carrying out this treatment.

A further object of the present invention is to provide structural embodiments of the device which are readily constructed and permit efficient use and operation thereof.

Other objects of the invention will in part be obvious and will in part appear hereinafter.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

For a fuller understanding of the nature and objects of the invention, reference should be had to the following detailed description taken in connection with the accompanying drawing, in which:

Fig. 1 is a side elevational view, with parts broken away and in section, of one embodiment of the apparatus of the present invention;

Fig. 2 is a top plan view of the structure shown in Fig. 1, with parts omitted;

Figs. 3 and 4 are views similar to Fig. 1 of modified forms of the apparatus; and Fig. 5 is a vertical elevational section of a further modification of the invention.

Referring to the drawing, like numerals identify similar parts throughout and, as indicated in the above identified Skinner et al. application, the embodiment of apparatus shown in Figs. 1 and 2 is particularly adapted for employment in a method of making pectin products from citrus fruit peel pieces. For that particular purpose the solid materials intake of the apparatus of Figs. 1 and 2 may comprise a shredder 4 including two gangs of circular blades 38—38 having serrated edges, each gang being mounted with suitable spacers upon a rotatable shaft 39 with the blades of one gang interlapped with those of the other. Both gangs of blades are rotatably mounted in a suitable casing 40 which may be provided with a discharge chute 41 leading to the intake end of a steamer apparatus 5.

The steamer apparatus 5, as shown in Figs. 1 and 2, comprises a pair of elongated conduits, tubular shells or enclosing casings 42 and 43 in each of which a conveyor screw 44 is mounted. These casings 42 and 43 may each comprise an elongated cylinder about a foot in diameter and about twenty feet (20') long, and the screws 44, 44 may have a lead of about a foot and each be rotated by its respective shaft 440 at a speed of about sixteen revolutions per minute (16 R. P. M.), the shaft being connected by any suitable means to any suitable power source (not shown). The discharge end 45 of the shell or enclosing casing 42 is elevated above the receiving end 46 with the axis of the screw 44 inclined as shown. In a typical apparatus of the invention, having the approximate dimensions indicated above, this elevation of the discharge end 45 of the enclosing casing 42 above the receiving end 46 may be about seven feet (7').

The elevated discharge end 45 of casing 42 is connected by a closed chute 47 to the receiving end 48 of the second enclosing casing 43. The connections of the chute 47 to the discharge end 45 and the receiving end 48 are made gas-tight for a purpose to be hereinafter indicated. The receiving end 48 of the enclosing casing 43 in a typical structure approximately dimensioned as indicated above may be elevated about three feet (3') above its discharge end 49. A pipe 50 is connected to the resultant enclosing structure in the vicinity of the portion at highest elevation, that is, connecting discharge end 45 and receiving end 48, preferably into the top of the shell 42 at the discharge end 45 thereof, as shown in Figs. 1 and 2.

In operation, the steaming apparatus 5 is adapted to receive at 46 a continuous supply of shredded citrus fruit peel which is moved by screw 44 up through the enclosing casing 43 and then moved theredown by the other screw 44, to the discharge end 49. This apparatus is designed to cause a particular mass of peel shreds to travel this path in a relatively short period of time, such as a few minutes. Steam is supplied through pipe 50 to flow down enclosing casing 42 countercurrent to the peel shreds moving upwardly by means of screw 44 to drive air out through the receiving end 46 such as by way of the shredder discharge chute 41 and up through the shredder 4. Steam also passes down through chute 47 into casing 43 and travels along with the shreds being moved therethrough to the open discharge end 49. As a result the peel shreds are thoroughly subjected to the action of steam and the temperature thereof is raised to about seventy to ninety degrees centigrade (70° to 90° C.) for a period of a few minutes without interfering with the continuity of movement thereof. By way of example this treatment may be a steam heating of the peel shreds to a temperature of about eighty-five degrees centigrade (85° C.) for about two minutes (2 min.).

This heating of the shredded peel destroys the semi-permeable membranes and the living cells in the peel so that a certain minimum amount of sugars and other extraneous or undesirable substances in solution in the cell sap may be effectively diffused out into washing liquid for subsequent elimination. This is of importance in the making of a pectin product since the method outlined in the identified Skinner et al. application is not characterized by an essential step of precipitation of pectin by aluminum salt or alcohol as is commonly practiced in the prior art. It is intended that the product, resulting from spray drying of the liquor extracted from the peel shreds preheated by this steam treatment, is to be usable as produced and accordingly the sugar content must be kept below an amount which would result in the production of a product evidencing undesirable characteristics of excessive caramelization which makes for insolubility. Further such steam treatment of grapefruit peel will permit subsequent washing out of the bitter principle without requiring additional treatment to accomplish this desired end. The steaming of the peel pieces also weights or water-logs them so that there will be assurance they will sink in washing liquid, such as water, thus greatly facilitating washing, and making possible and practical separation of particles of rag and pulp therefrom by flotation.

Suitable frame or supporting means are provided to hold the casing structure in the positions shown in Figs. 1 and 2. It may comprise support means 51 for the shredder 4 having a cross-bar 52 extending beneath second shell 43 for support of the discharge end 49 of the latter. Connecting chute 41 may serve to support intake end 46 of first shell 42, or other suitable means may be employed for that purpose. A frame bracket 53 may carry an arm 54 upon which intake end 48 of second shell 43 rests and connecting chute 47 may hold up discharge end 45 of first shell 42, or other suitable supporting means on frame bracket 53 may be employed for that purpose.

It will be noted that the first shell 42 has its discharge end 45 elevated above its intake end 46 an appreciable distance and that steam is let into the discharge end to be force-flowed downwardly countercurrent to upward movement of the material or peel pieces. Since steam is lighter than air such flow of steam to an extent where observable escape is noticed at the lower intake end 46, such as up through the open top of shredder 4, assures complete displacement of air in shell 42 around the discrete units of solid material or peel pieces and in the interstices of the upwardly moving mass by the treating steam. It will further be noted that the intake end 48 of the second shell 43 is appreciably elevated above its discharge end 49 and that here, also, the steam is supplied to the elevated end. There is thus complete assurance that all discrete units or peel pieces are intimately and entirely subjected to the action of the treating steam during all of the downward travel through shell 43 when steam escape is noticed at open discharge end 49. With such complete subjection of particles to steam during entire travel through the steamer apparatus certain steam treatments can consistently be attained with assured uniformity of results in unusually short periods of time.

Of course, it will be understood that though the apparatus of Figs. 1 and 2 is particularly adapted for steam treatment of citrus peel pieces it may be employed to advantage in gas treatment of various types of solid materials in the form of discrete units, e. g. particles. It can, for example, be employed advantageously in the degreening of fruits by subjecting them to action ethylene gas, the steam blanching of whole or cut vegetables or fruits generally as a treatment preceding quick-freezing or other processing thereof, etc. In the practice of steam treatments, observed escape of steam at the lower ends of the shells or enclosing casings through which the solid material is transported is an excellent and simple way of determining that the air in the apparatus has been displaced by the lighter-than-air treating gas, but of course where the treating gaseous medium is visually unapparent any suitable gas detecting means may be employed at the lower ends to assure the operator of an air-free condition.

Modifications of the apparatus of Figs. 1 and 2 may be employed in the steam blanching of vegetables or fruits and such modifications may take any of the forms proposed in Figs. 3, 4 and 5. As shown in Fig. 3 the cylindrical shells or casings 42 and 43 may have their upper ends 45 and 48 directly secured together for intercommunication, such as by welding along oblique edges at 470. As a result the two casings 42 and 43 take the form of an inverted V. The operation of and results attainable by the device of Fig. 3 are similar to those of the embodiment shown in Fig. 1, the conveying screws 44, 44 being rotated at such speed and the length of the path of travel of the fruit or vegetable material through the apparatus being such as to assure travel of the material through an atmosphere of pure steam at about eighty-five degrees centigrade (85° C.), for a period of time of about two minutes (2 min.) which assures effective steam blanching.

Of course, as previously indicated, usefulness of apparatus of the present invention is not limited to any particular processing of any specific materials. The results desired will dictate the materials handled thereby, the gaseous treating medium, and the times and temperatures of treatment. For example, embodiments of the apparatus can be used to advantage in actually cooking materials being treated, e. g., organic materials may be steam-cooked therein at temperatures in the neighborhood of one hundred degrees centigrade (100° C.) during a travel period up to an hour, if desired, or for even longer periods if required by the results intended.

In the gas-treating or steam-blanching apparatus shown in Fig. 4 the first casing 42 is again arranged obliquely and provided with the feeding screw 44. Its upper end, however, is connected at 1470 to the side of the closed upper end 148 of a substantially vertically arranged second casing 143. The latter need not be fitted with a feeding screw since the material will fall down it by force of gravity to the discharge end 149. Of course, such gravity feed through the second casing may be attained if it is arranged at an acute angle to the vertical, such angle being such as to assure sufficient slope for effective gravity flow of the solid material, character of the latter being suitably taken into account.

As shown in Fig. 5 the casing structure may take substantially the form of Fig. 3 or, if desired, the shells may be other than cylindrical, such as rectangular in cross-section. The feeding means may be in the form of an endless belt 5440 trained about pulleys 54, 55 and 56 so that runs thereof extend through the first casing 42 from the lower entrance end 46 to the elevated discharge end 45 thereof, through the second casing 43 from the elevated entrance end 48 to the lower discharge end 49 thereof, and thence from the latter back to the entrance end 46. Flights 544 fixed on the endless belt 5440 urge the discrete units of solid material through the casing structure for gas treatment in a manner equivalent to that practicable with the use of the apparatus of Fig. 3.

It will thus be seen that the objects set forth above and those made apparent in the preceding description are efficiently attained and, since certain changes in carrying out the above process and in the construction set forth, which embody the invention, may be made without departing from its scope, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. In a method of making a pectin product the procedure of preheating pieces of citrus fruit peel comprising continuously moving a mass thereof up through an elongated enclosed space, and continuously introducing hot lighter-than-air vapors into the enclosed space substantially at the highest point thereof thoroughly to displace the air in the space and to subject the mass for a few minutes as it is moved through the enclosed space to thorough action of the hot vapors and to break down the semi-permeable membrane of the living cells in the peel permitting diffusion out of the peel pieces into a subsequent washing liquid of at least certain proportions of sugars and other extraneous undesirable substances including bitter principle which are in solution in the cell sap so that they can be eliminated during subsequent washing and to weight the peel pieces to assure sinking thereof in the washing liquid.

2. In a method of making a pectin product the procedure of preheating pieces of citrus fruit peel comprising continuously elevating a mass thereof through an elongated enclosed space having a vapors-escape opening substantially at the bottom thereof, and continuously introducing hot lighter-than-air vapors into the enclosed space substantially at the highest point thereof thoroughly to displace the air in the space and to subject the mass for a few minutes as it is moved through the enclosed space to thorough action of the hot vapors and to break down the semi-permeable membrane of the living cells in the peel permitting diffusion out of the peel pieces into a subsequent washing liquid of at least certain proportions of sugars and other extraneous undesirable substances including bitter principle which are in solution in the cell sap so that they can be eliminated during subsequent washing and to weight the peel pieces to assure sinking thereof in the washing liquid.

3. In a method of making a pectin product the procedure of preheating pieces of citrus fruit peel comprising continuously moving a mass thereof through an elongated enclosed space having vapors-escape openings substantially at both ends in the vicinity of the bottom of the space first upwardly along an enclosed path forming a part of the enclosed space from one end of the latter to a point of highest elevation and then downwardly along another enclosed path forming another part of the enclosed space to the other end of the latter, and subjecting the continuously moving mass to thorough action of hot lighter-than-air vapors for a few minutes as said mass travels along both paths by continuously introducing the hot vapors into the enclosed space substantially at the point of highest elevation with vapors escape at the openings for substantially complete displacement of air in the space to break down the semi-permeable membrane of the living cells in the peel permitting diffusion out of the peel pieces into a subsequent washing liquid of at least certain proportions of sugars and other extraneous undesirable substances including bitter principle which are in solution in the cell sap so that they can be eliminated during subsequent washing and to weight the peel pieces to assure sinking thereof in the washing liquid.

4. A method of fully subjecting shredded citrus fruit peel to action of steam at an average effective temperature of 85° C. comprising the steps of continuously moving such material in tumbling separating fashion gradually from a lower to a higher level, continuously moving such material in tumbling separating fashion from the higher level reached in step one to a lower level, maintaining such material enclosed during the movements of steps one and two, and introducing steam into contact with such material at the highest point reached and therewith substantially completely displacing air from contact with such material for the full path of movement of such material in its ascent and descent.

5. The method of claim 4 in which such citrus fruit peel is subjected to the steam for a period of less than three (3) minutes.

BRONSON C. SKINNER.

References Cited in the file of this patent

UNITED STATES PATENTS

| Number | Name | Date |
|---|---|---|
| 245,274 | Byerley | Aug. 3, 1881 |
| 705,787 | Pratt | July 29, 1902 |
| 1,371,546 | Bollmann | Mar. 15, 1921 |
| 1,386,224 | Barker | Aug. 2, 1921 |
| 1,630,071 | Offenhauser | May 24, 1927 |
| 1,706,554 | Weber | Mar. 26, 1929 |
| 1,793,638 | Rowton et al. | Feb. 24, 1931 |
| 2,022,470 | Leo et al. | Nov. 26, 1935 |
| 2,038,582 | Leo | Apr. 28, 1936 |
| 2,061,910 | Kingston | Nov. 24, 1936 |
| 2,097,081 | Rooker | Oct. 26, 1937 |
| 2,334,015 | Levine et al. | Nov. 9, 1943 |
| 2,455,382 | Nelson | Dec. 7, 1948 |

FOREIGN PATENTS

| Number | Country | Date |
|---|---|---|
| 312,433 | Great Britain | May 30, 1929 |